United States Patent
Lie (12)

(10) Patent No.: US 6,193,007 B1
(45) Date of Patent: Feb. 27, 2001

(54) REAR SUSPENSION AND DRIVE AXLE ASSEMBLY

(75) Inventor: Tjong T. Lie, Farmington Hills, MI (US)

(73) Assignee: Mohinder Kumra, Dearborn, MI (US)

( * ) Notice: Subject to any disclaimer, the term of this patent is extended or adjusted under 35 U.S.C. 154(b) by 0 days.

(21) Appl. No.: 09/370,061

(22) Filed: Aug. 6, 1999

(51) Int. Cl.$^7$ .................................................. B60K 17/00
(52) U.S. Cl. ........................... 180/374; 180/372; 180/352
(58) Field of Search .................................. 180/371, 372, 180/374, 378, 352, 353, 354, 297, 376, 379

(56) References Cited

U.S. PATENT DOCUMENTS

| | | | | |
|---|---|---|---|---|
| 2,954,835 | * | 10/1960 | Janeway ................................ | 180/353 |
| 3,768,829 | * | 10/1973 | Colovas et al. ....................... | 180/352 |
| 3,963,089 | * | 6/1976 | Crawford ............................. | 180/378 |
| 4,216,840 | * | 8/1980 | Dick ..................................... | 180/371 |
| 4,343,375 | | 8/1982 | Manning . | |
| 4,362,221 | | 12/1982 | Manning . | |
| 5,012,885 | * | 5/1991 | Hilden ................................. | 180/353 |
| 5,931,255 | * | 8/1999 | Sewell ................................. | 180/374 |
| 6,095,005 | * | 8/2000 | Tanzer et al. ......................... | 180/371 |

OTHER PUBLICATIONS

GKN Brochure, Bauart 102, 108 and 162, 1991.
Short Coupling SC.
AM General Calendar, "Unique Design And Tough Components Make The AM General Difference", 1999.
Mega Cruiser Powertain And Chassis, Toyota Corporation Manual, 1990.
1 1/4 Ton HMMWV, 1979.
"Brake System", Hummer Manual, pp. 7–12.
Hummer Article, International Defense Review, May 1982, p. 584.
Anchorlok Life Seal Is Tough As Alaska, 1998.

* cited by examiner

Primary Examiner—Lanna Mai
Assistant Examiner—Lynda Jasmin
(74) Attorney, Agent, or Firm—Brooks & Kushman P.C.

(57) ABSTRACT

A bus or truck having an engine, a transmission and a differential directly assembled to the frame and geared hubs assembled to a carriage frame to which the wheels of the vehicle are secured to provide the lowest possible floor height. The carriage frame supports the vehicle on air springs. Right and left geared hubs are directly assembled to the carriage frame and are operatively connected to the right and left half axles and the right and left wheel sets. The geared hubs provide a second level of gear reduction. The geared hubs are assembled to the wheel carriage frame with the axis of rotation of the drive axles and the axis of rotation of the wheels aligned in either a fore and aft direction or are aligned with the axis of the half axles being directly above the axis of the wheels. Air brakes on the drive axles provide braking action prior to the gear reduction of the geared hubs allowing for the use of smaller air disc brakes. The size of the differential housing may also be reduced because the ring gear and pinion gear set are smaller than would be required if the same level of gear reduction is provided without the use of the geared hubs. The geared hubs allow the height of the vehicle floor to be established at a lower level. The air disc brakes provide both a normal braking function and a parking brake function.

14 Claims, 4 Drawing Sheets

REAR SUSPENSION AND DRIVE AXLE ASSEMBLY

TECHNICAL FIELD

The present invention relates to the rear suspension and drive axle of a motor vehicle, and in particular of a bus or delivery truck, that facilitates providing the lowest possible floor height.

BACKGROUND ART

Drive wheels of commercial trucks and busses are generally driven by transverse axles that connect wheels mounted on wheel hubs to a large differential disposed in the center of the vehicle body. The vehicle body includes a rigid frame that is supported on a spring suspension on the axles. Brakes are generally provided adjacent the wheel hubs.

Some of the disadvantages associated with such designs are loading restrictions and high floor heights that are generally required to maintain vertical clearance between the vehicle body, the differential and other parts of the drive axle assembly. Attempts to minimize these problems have included mounting the differential to the vehicle body and using universal joints in the axles. This approach has required complex wheel support structures that lack durability and add cost.

Prior art bus designs generally have relatively high floors that require at least two steps in the doorway for ingress and egress. To make such buses useable by handicapped persons it is normally necessary to add a wheelchair lift.

Prior art commercial truck designs, especially of the type used for package delivery, normally have rear wheel drive with a front end mounted engine. Problems associated with these trucks include a relatively high floor height, vehicle weight, payload weight and space constraints.

Examples of prior art designs are disclosed in U.S. Pat. No. 4,362,221 and U.S. Pat. No. 4,343,375 that each disclose a vehicle drive wheel suspension in which the differential housing is carried by the body and frame structure of the vehicle while the wheels are connected to the differential by live axles having universal joints. Wheel bearings are connected to rigid support members forming part of the laterally opposite ends of the drive axle. The support members are connected by transversely extending rails that require clearance forward and rearward of the differential for vertical movement.

These and other disadvantages and problems associated with prior art designs are addressed by the invention as summarized below.

DISCLOSURE OF INVENTION

The present invention relates to a motor vehicle having an engine and transmission assembled to a frame of the vehicle with the transmission forward or rearward of the engine. The vehicle has a rear drive axle and suspension assembly comprising a differential operatively connected to an output shaft of the transmission to receive rotational force from the engine for driving the vehicle. The differential is directly assembled to the frame and has right and left drive axle output shafts. The output shafts are connected by universal joints to right and left half axles that are connected to geared hubs. The geared hubs are directly assembled to a carriage frame. The differential provides a first level of gear reduction while the geared hubs provide a second level of gear reduction. Right and left wheels or sets of wheels are operatively connected to the right and left geared hubs respectively.

According to another aspect of the invention, the geared hubs are mounted on the vehicle so that the axis of rotation on the drive axles and the axis of rotation of the wheels, or wheel sets, may be oriented with the axis of the drive axles directly above the axis of the wheels or at the same height as the axis of the wheels to permit lowering of the vehicle floor height. The floor height may also be established at a lower level due to the gear reduction provided by the geared hubs that permits the ring and pinion gear of the differential set to be reduced in size due to the reduced need for gear reduction at the differential and allows the use of a smaller differential housing.

According to another aspect of the invention, air disc brakes are provided on the drive axles between the differential and the geared hubs that permit braking forces to be applied prior to the final gear reduction in the geared hubs. This gear reduction at the wheel hubs allows for the use of smaller air disc brakes. The air disc brakes each have a combination brake chamber having an internal spring for providing a parking brake function for the vehicle thereby utilizing the air disc brakes that are used for normal vehicle braking.

According to another aspect of the invention, fore and aft torque rods can be provided between the frame of the vehicle and the carriage frame. The torque rods preferably include a bar pin that connects to a bracket on the frame that is adjustable by inserting shims in the bracket.

These and other aspects of the present invention will be better understood upon reference to the attached drawings and in light of the attached detailed description of the best modes of practicing the invention.

BEST MODE FOR CARRYING OUT THE INVENTION

Figure 1:
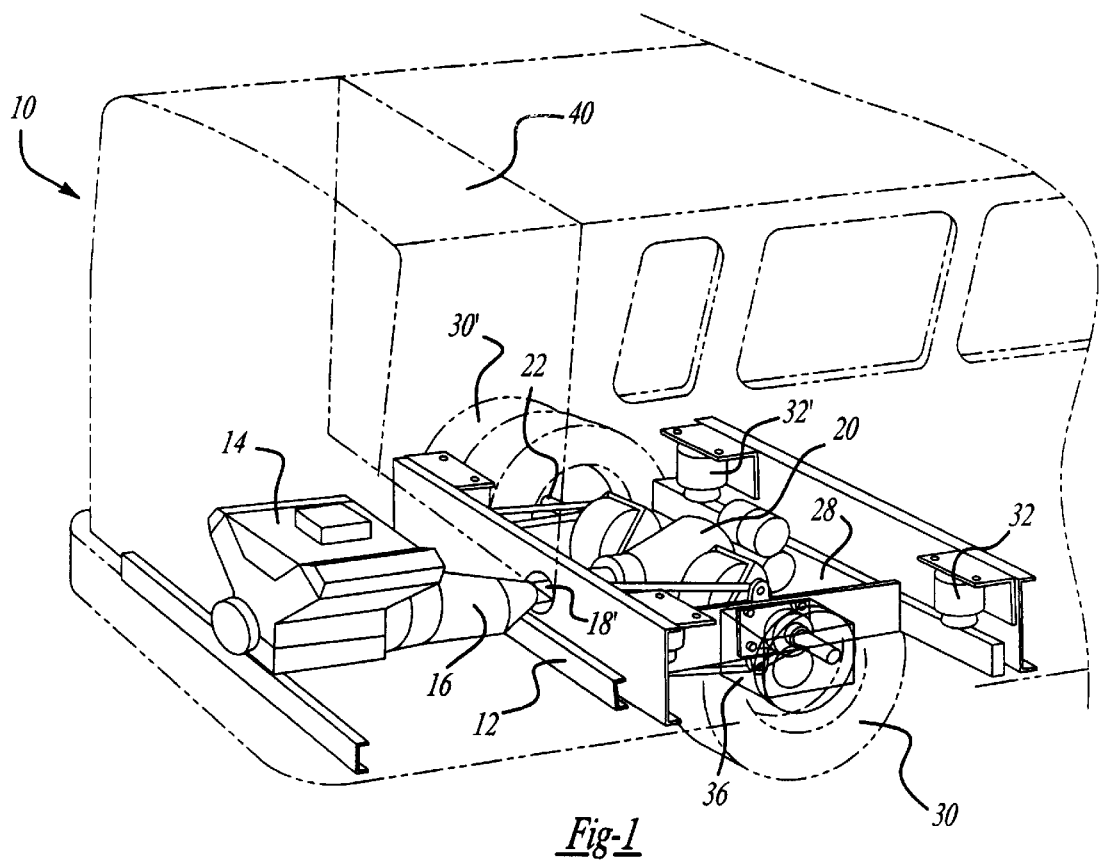
FIG. 1 is a fragmentary perspective view of a bus having a rear axle drive and suspension system made according to the present invention.
Figure 2:
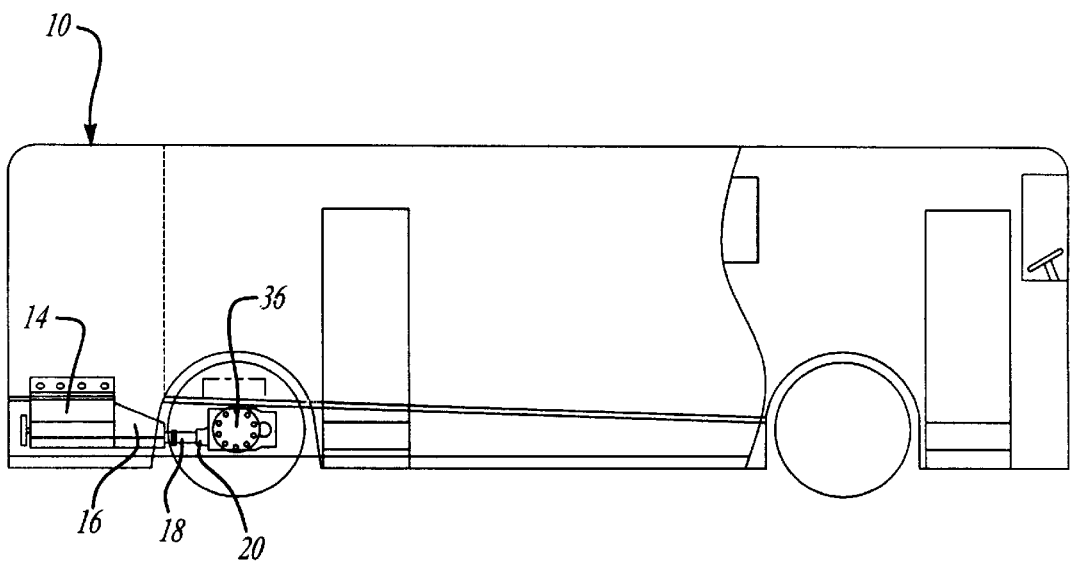
FIG. 2 is a side elevation view of a bus having the rear axle drive and suspension system made according to the present invention.

Referring now to FIGS. 1 and 2, a vehicle 10, for example a bus, is shown to include a vehicle frame 12 to which an engine 14 and transmission 16 are secured. A drive shaft 18 powered by the engine 14 through the transmission 16 extends from the transmission 16 to a differential 20. In this embodiment, the drive shaft may be less than 12 inches long and may comprise a spline shaft and constant velocity joints as will be more specifically described below. Differential 20 is of a conventional design including a ring gear and pinion gear (not shown) having a gear reduction ratio, for example, of about 3:1.

A carriage frame 28 supports right and left wheel sets 30 and 30' that may be either tandem wheels or single wheels depending upon the weight and load requirements of the vehicle. Right and left front air springs 32 and 32' and rear air springs 34 and 34' are preferably secured to the upper surface of the carriage frame 28 and to the vehicle frame 12 so that the air springs on the vehicle is supported on the carriage frame 28 and wheel sets 30, 30'.

Figure 3:
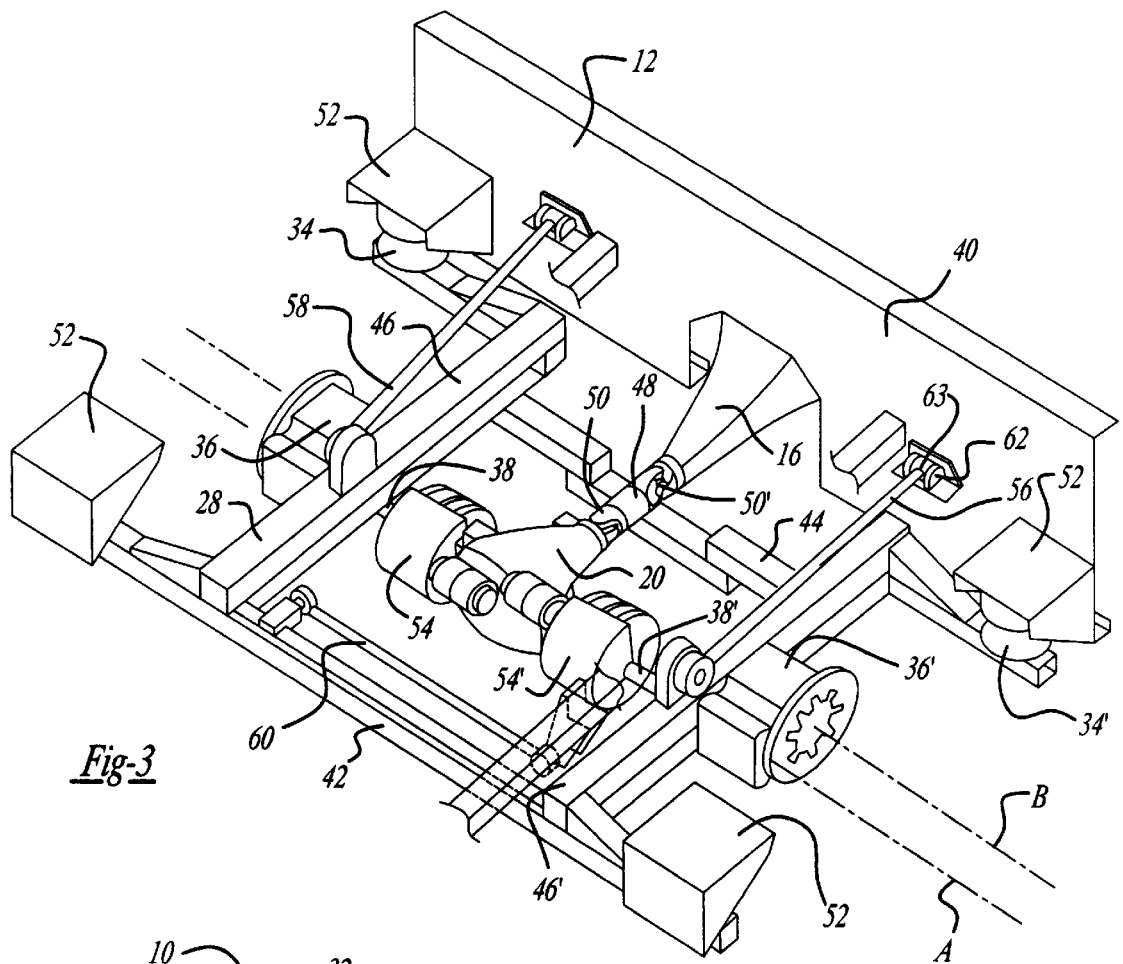
FIG. 3 is a fragmentary perspective view of the rear axle drive and suspension system made according to the present invention.
Figure 4:
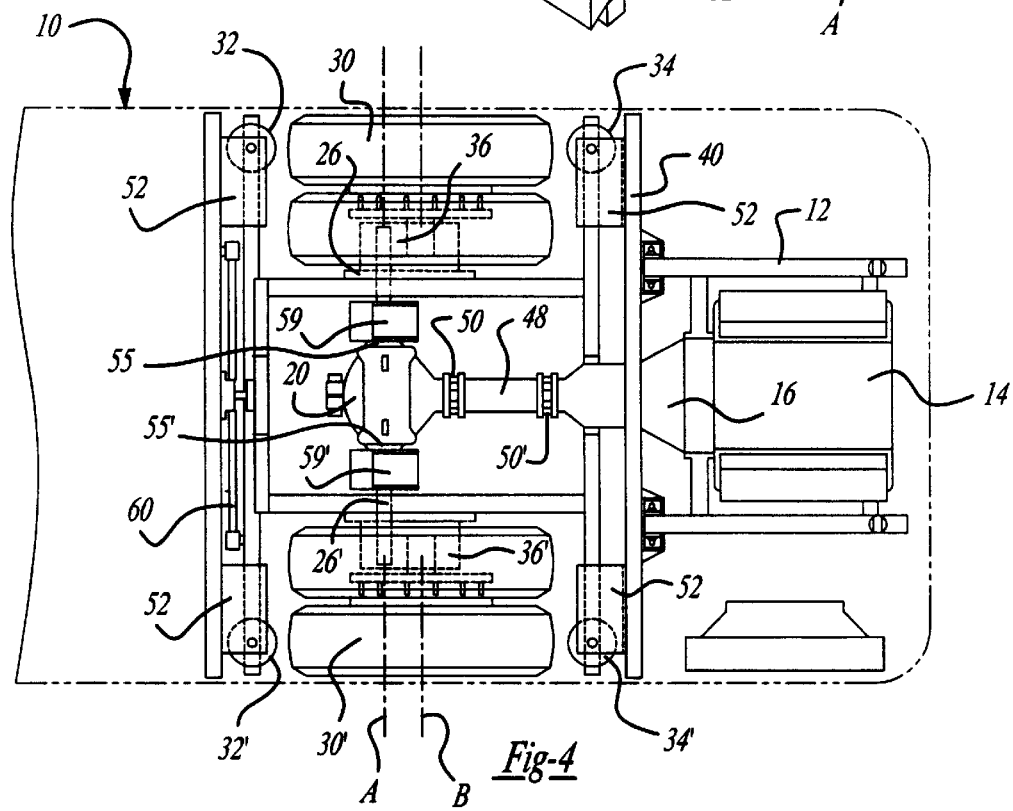
FIG. 4 is a plan view of the rear axle drive and suspension system made according to the present invention.
Figure 5:
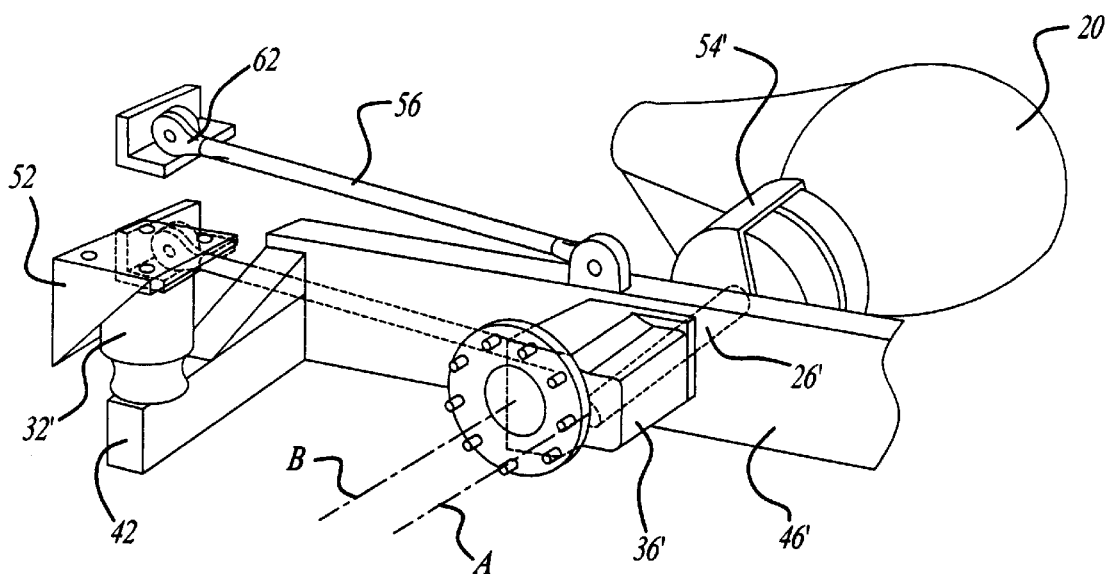
FIG. 5 is a fragmentary perspective view of a portion of the rear axle drive and suspension system for a bus made in accordance with the present invention.

Referring now to FIGS. 3, 4 and 5, the structure of the carriage frame 28 and its associated components are described in greater detail. Right and left rear air springs 34 and 34' are secured between the carriage frame 28 and the vehicle frame 12. Right and left geared hubs 36 and 36' are secured to the carriage frame 28. Geared hubs 36 and 36' preferably provide, for example, about a 2:1 gear reduction for the rotational input received from the right and left half shafts 38, 38' and provide driving output to the wheel sets 30, 30'. Axis A is the rotational axis of the half shafts 26 and 26' and axis B is the rotational axis of the wheel sets 30, 30'.

The transmission 16 is connected by a spline shaft connector 48 of the drive shaft 18 to the differential 20. The transmission 16 extends partially through a fire wall 40. The drive shaft also may include constant velocity joints, or U-joints, 50, 50'.

The carriage frame 28 includes a front rail 42 and a rear rail 44 that are interconnected by right and left side rails 46 and 46'. Air spring housings 52 are secured to the vehicle frame on their upper ends and are connected to front and rear air springs 32, 32', 34, 34' that are in turn connected to opposite sides of the front and rear rails 42 and 44.

Right and left air brakes 54 and 54' are provided on the differential output shafts 55, 55'. The air brakes 54 and 54' are reduced in size due to the fact that the brake action is subject to gear reduction in the geared hubs 36, 36'.

Referring now to FIGS. 3 and 5, right and left sides of the vehicle are each provided with an upper torque rod 56, 56' and lower torque rods 58, 58'. The torque rods are secured between the vehicle frame 12 and right and left side rails 46, 46'. Transverse torque rod 60 is secured between vehicle frame 12 and front rail 42. The torque rods 56, 58 and 60 are preferably connected by a bar pin bracket 62 to the vehicle frame 12 to permit adjustment of the torque rods. The bar pin 63 bracket 62 can be adjusted by simply placing a shim between the bar pin 63 and bracket 62 and the frame 12 or by placing washers between the bar pin 63 and bracket 62. Shock absorbers (not shown) extend between the vehicle frame 12 and carriage frame 28 in a conventional manner.

Figure 6:
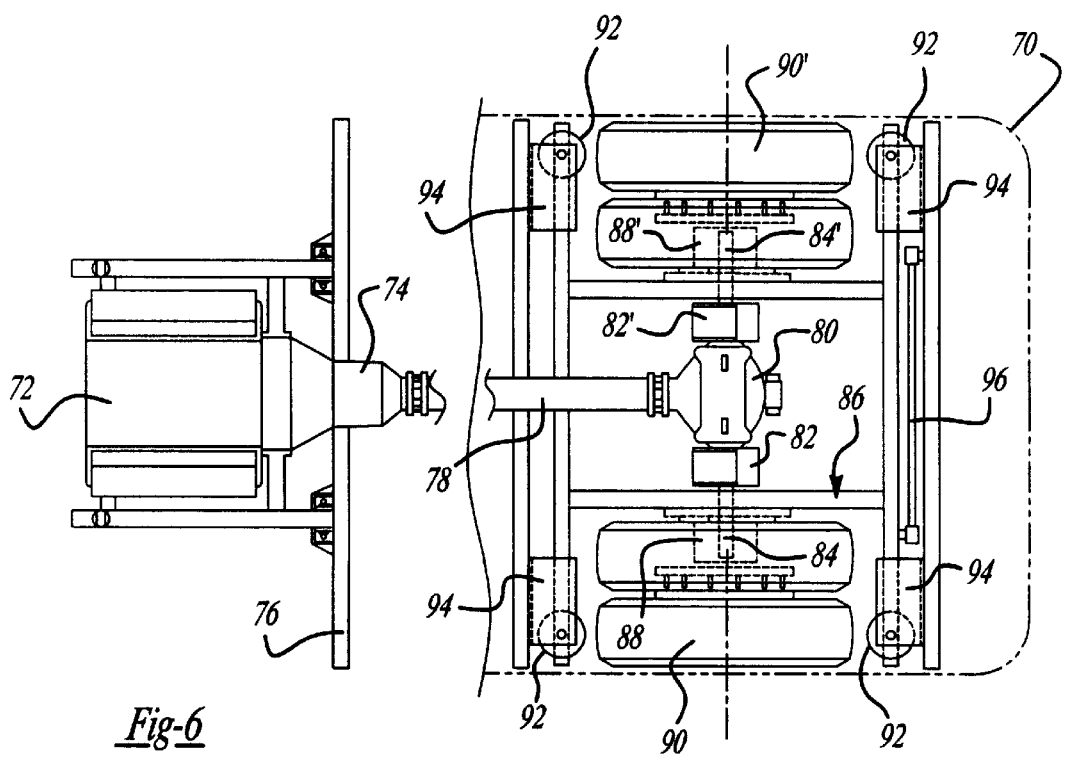
FIG. 6 is a fragmentary plan view of an alternative embodiment of a rear axle drive and suspension system for a truck having a front end mounted engine.
Figure 7:
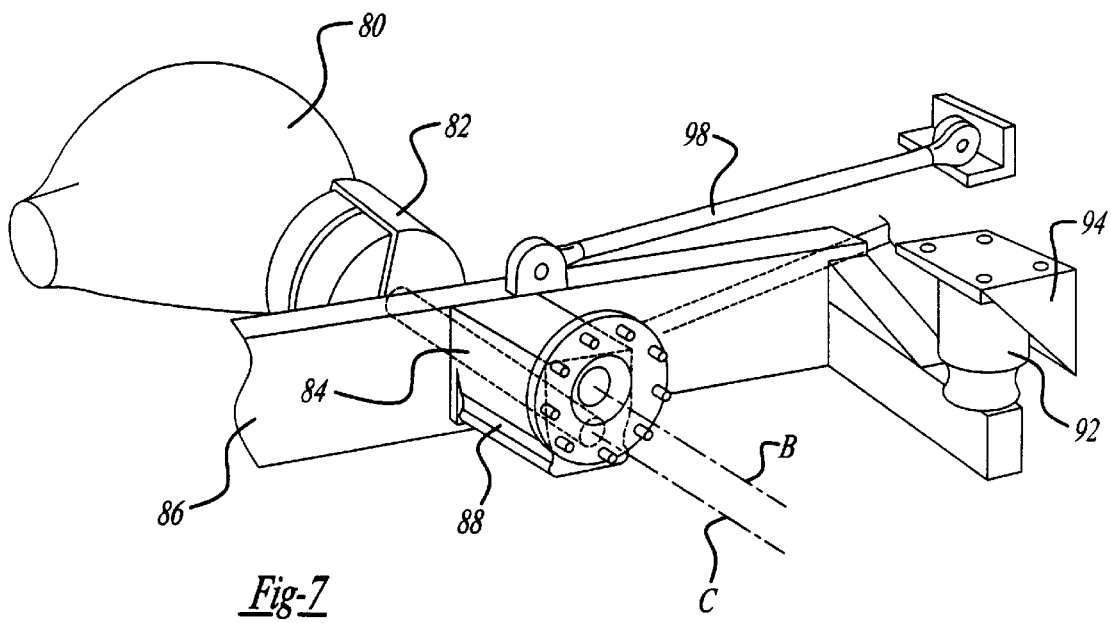
FIG. 7 is a perspective view of a portion of the rear axle drive and suspension for a truck having a front end mounted engine.

Referring now to FIGS. 6 and 7, alternative embodiment of the present invention is shown as applied to a truck 70 having a front end mounted engine 72. The engine 72 is operatively connected to a transmission 74 that are both secured to the frame 76 of the vehicle. A drive shaft 78 connects the transmission 74 to a differential 80. Differential 80 is also secured to the frame 76 of the truck 70.

Air brakes 82, 82' are provided on the right and left sides of the differential 80. Half shafts 84 and 84' are also provided on right and left sides of the differential 80.

A carriage frame 86 supports geared hubs 88, 88' that interconnect the half shafts 84, 84' to wheel sets 90, 90'. The geared hubs 88, 88' and wheel sets 90, 90' are supported on the carriage frame 86. Air springs 92 are retained by air spring brackets 94 at four corners of the carriage frame 86. The air springs 92 support the frame 76 of the truck 70 on the carriage frame 86.

A transverse torque rod 96 interconnects the rear portion of the carriage frame 86 to the vehicle frame 76. As illustrated in FIG. 7, an upper torque rod 98 connects another portion of the carriage frame 86 to the vehicle frame 76.

Figure 8:
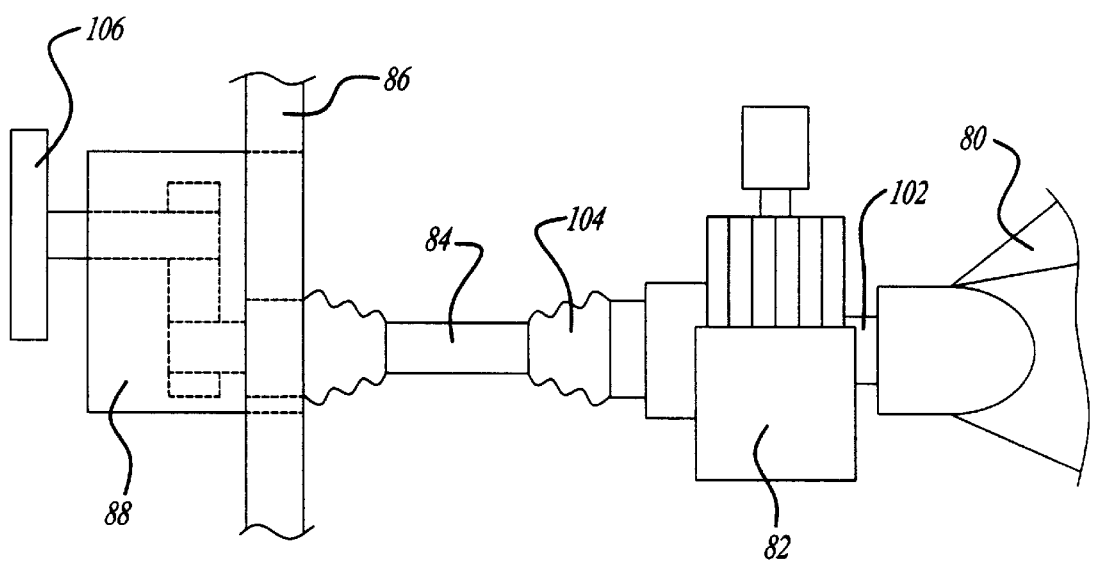
FIG. 8 is a front elevation view of the drive axle connection between the differential and geared hub made in accordance with the present invention.

Referring now to FIG. 8, the axle assembly extending between the differential 80 and geared hubs 88 is described in greater detail. While this description is provided for the embodiment of FIGS. 6 and 7, the construction of the axle half shaft for the embodiment of FIGS. 1–5 is essentially identical in all material respects. The differential 80 has an output shaft 102 to which the air brake 82 is assembled. The output shaft 102 is connected by a constant velocity joint 104, or U-joint, to the half shaft 84. Half shaft 84 provides rotational input about axis C to the geared hub 88 about axis B that in turn provides an output to the wheel hub 106 that is adapted to receive a wheel set similar to the wheel set 90 shown in the embodiment of FIGS. 1–5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A motor vehicle drive train having an engine and transmission assembled to a vehicle frame with the transmission forward of the engine, the transmission having an output shaft, the vehicle having a floor supported on the vehicle frame that is supported on a vehicle suspension comprising:

a differential operatively connected to the output shaft of the transmission to receive rotational force from the engine for driving the vehicle, said differential being directly assembled to the vehicle frame, the differential having right and left drive axle output shafts wherein the differential provides a first level of gear reduction;

right and left constant velocity joints operatively connected to right and left drive axle output shafts and right and left half axles, respectively;

a carriage frame;

right and left wheel sets carried by the carriage frame;

the vehicle suspension having springs attached to the carriage frame that support the vehicle frame;

right and left geared hubs directly assembled to the carriage frame, the geared hubs receiving rotational force from the right and left half axles, respectively, and providing rotation force to the right and left wheel sets, respectively, wherein the geared hubs provide a second level of gear reduction.

2. The motor vehicle of claim 1 wherein the right and left half axles have an axis of rotation and the right and left wheels have an axis of rotation, and the geared hubs are assembled to the carriage frame with axis of the half axles forward of axis of the wheels.

3. The motor vehicle of claim 1 wherein the geared hubs are assembled to the carriage frame with the axis of rotation of the half axles being forward of and at the same vertical height as the axis of the wheels.

4. The motor vehicle of claim 1 wherein the right and left half axles have an axis of rotation and the right and left wheels have an axis of rotation, and the geared hubs are assembled to the carriage frame with axis of the half axles directly below the axis of the wheels.

5. The motor vehicle of claim 1 wherein the geared hubs provide a gear reduction of about 2:1.

6. The motor vehicle of claim 5 wherein the size of the differential housing is relatively smaller in size because the ring gear diameter and pinon set is reduced relative to the size that would be required for the same level of gear reduction without the geared hubs due to the gear reduction provided by the geared hubs.

7. The motor vehicle of claim 5 wherein disc brakes are provided on the half drive axles to provide braking action that permits the disc brakes to be relatively smaller in size than would be necessary if the brakes were provided on the wheels due to the gear reduction provided by the geared hubs.

8. The motor vehicle of claim 1 wherein upper and lower torque rods are provided between the frame of the vehicle and the carriage frame, the torque rods having a bar pin that connects to a bracket on the frame that is adjustable by inserting shims in the bracket.

9. A motor vehicle having an engine and transmission assembled to a vehicle frame with the transmission rearward of the engine, the transmission having an onput shaft, the vehicle having a floor supported on the vehicle frame that is supported on a vehicle suspension comprising:

a differential operatively connected to the output shaft of the transmission to receive rotational force from the engine for driving the vehicle, said differential being directly assembled to the vehicle frame, the differential having right and left drive axle output shafts wherein the differential provides a first level of gear reduction;

right and left constant velocity joints operatively connected to right and left drive axle output shafts and right and left half axles, respectively;

a carriage frame;

right and left wheel sets carried by the carriage frame;

the vehicle suspension having springs attached to the carriage frame that support the vehicle frame;

right and left geared hubs directly assembled to the carriage frame, the geared hubs receiving rotational force from the right and left half axles, respectively, and providing rotational force to the right and left wheel sets, respectively, wherein the geared hubs provide a second level of gear reduction.

10. The motor vehicle of claim 9 wherein the right and left half axles have an axis of rotation and the right and left wheels have an axis of rotation, and the geared hubs are assembled to the carriage frame with axis of the half axles directly below the axis of the wheels.

11. The motor vehicle of claim 9 wherein the geared hubs provide a gear reduction of 2:1.

12. The motor vehicle of claim 11 wherein the size of the differential housing is relatively smaller in size because the ring gear and pinon set is reduced relative to the size that would be required for the same level of gear reduction without the geared hubs due to the gear reduction provided by the geared hubs.

13. The motor vehicle of claim 11 wherein disc brakes are provided on the drive axles to provide braking action that permits the disc brakes to be relatively smaller in size than would be necessary if the brakes were provided on the wheels due to the gear reduction provided by the geared hubs.

14. The motor vehicle of claim 9 wherein fore and aft torque rods are provided between the frame of the vehicle and the carriage frame, the torque rods having a bar pin that connects to a bracket on the frame that is adjustable by inserting shims in the bracket.

* * * * *

UNITED STATES PATENT AND TRADEMARK OFFICE
CERTIFICATE OF CORRECTION

PATENT NO.    : 6,193,007
DATED         : February 27, 2001
INVENTOR(S)   : Tjong T. Lie Page 1 of 1

It is certified that error appears in the above-identified patent and that said Letters Patent is hereby corrected as shown below:

<u>Column 5,</u>
Line 24, claim 9: Delete "onput" and insert -- output --.

Signed and Sealed this

Thirty-first Day of July, 2001

*Attest:*

*Attesting Officer*

NICHOLAS P. GODICI
*Acting Director of the United States Patent and Trademark Office*